March 25, 1930.  A. S. PLATER  1,752,107
EMBOSSING CUTTER HEAD
Filed Aug. 9, 1929
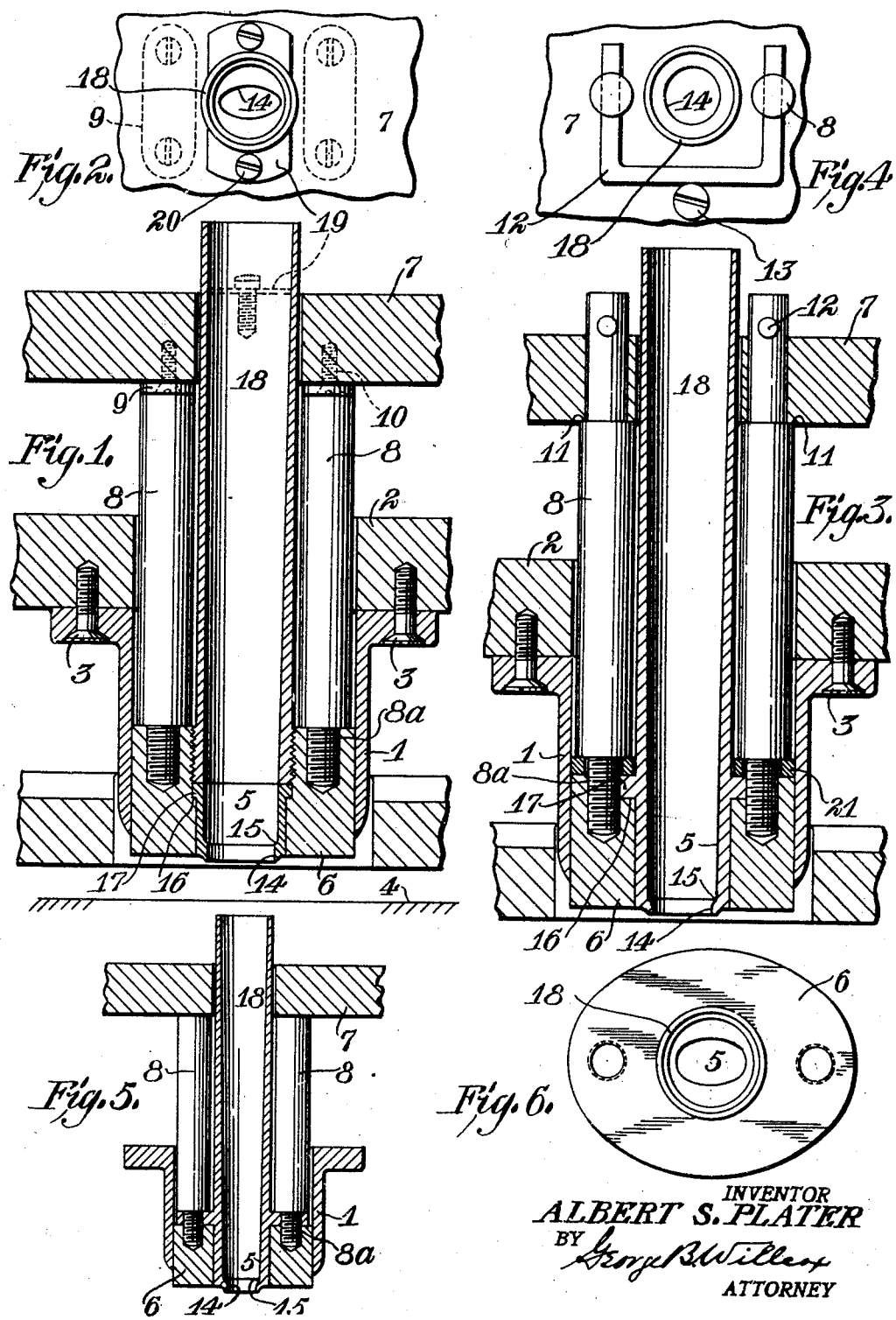
INVENTOR
ALBERT S. PLATER
BY George B. Willey
ATTORNEY Patented Mar. 25, 1930

1,752,107

UNITED STATES PATENT OFFICE

ALBERT S. PLATER, OF SAGINAW, MICHIGAN, ASSIGNOR TO BAKER PERKINS COMPANY, INC., OF SAGINAW, MICHIGAN, A CORPORATION OF NEW YORK

EMBOSSING CUTTER HEAD

Application filed August 9, 1929. Serial No. 384,734.

This invention relates to cutting and embossing machines used in manufacturing biscuits, confectionery, pastry and similar goods and pertains particularly to a cutter head of improved construction.

Usually cutter heads of the class mentioned are employed in machines for cutting out articles such as cookies, crackers, biscuits and the like from a sheet of dough placed upon a table or conveyor bed below a vertically reciprocating cross-head. The cutter heads ordinarily comprise a contour cutting die of any desired shape within which is arranged an embossing and ejecting plunger movable relatively to the contour cutter and by which the article that is cut out of the sheet of dough is pushed from the cutter when the latter is raised.

The article is formed with a hole, usually central, and produced by an inner tubular hole-cutter that is carried by the plunger and projects below its working face.

Difficulty has been encountered in these machines because of the occasional failure of the central scrap piece of dough to remain in the tubular hole-cutter when it is raised after a cutting operation. In that event the scrap piece escaped from the cutting end of the tubular hole-cutter, dropped onto the dough sheet and at the next descent of the embossing plunger spoiled the appearance of a subsequently cut biscuit.

Another difficulty has been encountered because of the necessity of dismantling the plunger when the tubular hole-cutter required removal or when it was desired to substitute a central embossing die or trade-mark pattern for the cut-out hole of the finished goods.

My invention overcomes those defects, and hence has as its objects:

To provide the tubular passage of the hole cutter, at its cutting end, with a retainer to hold previously cut pieces of material in the hole-cutter and prevent their escaping from its cutting end onto the uncut sheet of material.

To mount a tubular hole-cutter in the embossing plunger in a way that will facilitate its quick removal or replacement, and the substitution of a differently contoured hole-cutter.

To provide in conjunction with such tubular hole-cutter a scrap tube or discharge channel which is easily removable, which may also serve as a retainer for the hole-cutter in the embossing plunger, and which can be utilized, if desired, for applying suction to assist in lifting the lozenge-like scrap piece when the hole-cutter is raised after each cutting operation.

With the foregoing and certain other objects in view, which will appear later in the specification the invention comprises the devices described and claimed and the equivalents thereof.

In the drawings Fig. 1 is a longitudinal section through a cutter head embodying my improvement.

Fig. 2 is a fragmentary top plan view of the parts shown in Fig. 1.

Fig. 3 is a longitudinal sectional view of a modified form.

Fig. 4 is a top plan view of the same.

Fig. 5 is a part sectional view of a further modified form.

Fig. 6 is a top plan view of the embossing plunger and scrap tube.

The cutter head shown in the drawings comprises an outer tubular contour cutter 1 of any desired form. It is fixed to the under side of a vertically reciprocable cross head or cutter block 2 by means of screws 3.

This cutter block 2 in its reciprocatory movement carries the tubular cutter 1 into and out of contact with the sheet of dough that lies on the bed 4 of the machine.

Within the contour cutter 1 is an inner tubular hole-cutter 5 of any suitable shape, in the form illustrated, elliptical. In the annular space between the contour cutter 1 and the hole cutter 5 is the embossing and ejecting plunger 6 which has vertical movement imported to it relative to the dough sheet and also to the contour cutter 1, as is usual in this class of machines.

The plunger 6 is secured to a vertically movable embosser plate 7 by means of a pair of die studs 8, whose lower reduced ends 8ª are threaded into the back of the plunger. In the form shown in Figs. 1 and 2 the upper ends of the studs are fitted with flanges 9 and secured to the plate 7 by screws 10. In the forms shown in Figs. 3 and 4 the upper ends of the studs are turned to smaller diameter, presenting shoulders 11 that take against the under side of the embosser plate. The projecting upper ends of these studs are perforated and are locked in place by a U-shaped locking bar 12 whose ends are thrust through the perforations, the U-shaped bar being held in place by a retaining screw 13 on the embosser plate. If desired the reduced upper ends of the studs are threaded and may be equipped with locking nuts.

Since the mechanisms by which the outer contour cutter and the embosser plate with its plunger and tubular hole-cutter are given their relative reciprocating movement are well known in the art and form no part of my present invention, they are not illustrated herein, it being understood that any suitable actuating mechanism may be employed for these working parts.

In my invention the tubular hole-cutter 5 is provided at its cutting end with an internally projecting rib 14 that may extend clear around the inner periphery of the tubular cutter, or may consist of a slight projection, or series of projections distributed around the cutter on its inside wall. The upper part of this rib, or series of projections, forms a shoulder 15, the function of which is to hold the previously cut pieces of material in the bore of the hole-cutter and prevent their escape from its cutting end and dropping onto the uncut sheet of material and thereby spoiling the surface appearance or embossed pattern of a subsequent biscuit by reason of the surplus dough piece being pressed into its face.

This internal rib or projection makes the transverse area of the hole cutter smaller at its cutting edge than elsewhere, so that a scrap dough piece cut from the biscuit piece by the hole-cutter will be of slightly smaller diameter than the bore of the upper part of the hole-cutter and consequently the cut dough piece can expand slightly when it is pushed beyond the rib 14, and this normal expansion causes the edges of the cut piece to engage the upper shoulders of the rib 15 and effectually prevents the pieces from dropping out. Only a slight projection is required for the rib 14 in order to produce this desirable result. In fact for ordinary purposes a shoulder having a projection of five thousandths of an inch is sufficient.

I mount the tubular hole-cutter 5 in the embossing plunger 6 in such a way as to facilitate its quick removal or replacement by forming in the back face of the plunger 6, that is, the face remote from the embossing surface, a recess counterbored to present a shoulder 16 to receive an outwardly projecting flange 17 formed on the upper end of the hole-cutter 5.

To carry away the scrap pieces produced by the hole-cutter I provide a scrap tube 18, the lower end of which is received in the recess of the plunger, the tube extending upwardly through the cutter block 2 and the embosser plate 7. The lower end of tube 18 may be made to serve as a retainer for the hole-cutter 5 and for that purpose may be threaded into the recess of plunger 6, as shown in Fig. 1. The tube may be prevented from unscrewing by a retaining flange 19 integral with the tube near its upper end and secured to the embosser plate 7 by screws 20.

A modified form of scrap tube is shown in Fig. 3 integral with the tubular hole-cutter 5. In this instance the tubular hole-cutter is held in place by a washer 21 clamped to the back face of plunger 6 and flange 17 by means of the reduced threaded ends $8^a$ of the studs 8.

In Fig. 5 a still further modified form of tube fastening is shown, wherein the flange of the hole-cutter is made wide enough to receive the threaded ends $8^a$ of the die studs 8. In this mode of fastening the washer 21 is not required.

In operation, the cutter block 2 and its tubular contour cutter 1 descend and cut out a biscuit from the dough sheet on the table. The embossing plunger 6 descends and carries with it the tubular hole-cutter 5 which cuts out the central scrap piece of dough while the plunger is embossing the top face of the biscuit dough piece. The contour cutter then recedes faster than the ejecting plunger 6 and the finished dough piece is left on the table, while the tubular hole-cutter 5 rises, carrying with it the central scrap piece which expands so that it can not drop out through the lower end of the hole-cutter. As the operation continues the scrap tube 18 fills with scrap pieces which are progressively pushed out at the top as the work proceeds, and if desired the pieces may be removed by suction applied at the top of the tube, or by any other suitable means.

When it is desired to replace the tubular hole-cutter or to substitute for it a small die, carrying a trade-mark or other embossed mark, it is only necessary to detach the retaining flange 19 by lowering screw 20, unscrew the scrap tube 18 and remove it, if the device is constructed as shown in Fig. 1, and then fish the loose tubular hole-cutter out by means of a bent wire hook. If the construction of Fig. 3 is employed, the screw 13 and locking bar 12 are detached, the die studs unscrewed from the flange 6, permitting the integral scrap tube and hole-cutter, with washer 21 to be removed from the cutter block 2 and the embosser plate 7.

There may be provided hole-cutters of different contours, as for instance hexagon, instead of the elliptical form shown in Fig. 2, and the change from one shape to the other can be made easily.

By the means above described I have produced a new and useful cutter head construction that accomplishes, by simple and inexpensive means, all of the stated objects of the invention as claimed.

Having thus described my invention, what I claim and desire to secure by Letters Patent is:

1. In a cutter head of a candy or biscuit cutting machine including an embossing plunger, an inner tubular hole-cutter having an outwardly projecting flange at its upper end received in a counter-bored recess formed in the back face of the plunger, a scrap tube received in said recess, said hole cutter having its tubular passage restricted at the cutting end, for the purposes set forth.

2. In a biscuit cutting machine an embossing and ejecting plunger formed with a counterbored aperture presenting an internal shoulder, a tubular hole-cutter removably received in said aperture and having a flange seated on said shoulder, and means for releasably securing said hole-cutter in the plunger, for the purposes set forth.

In testimony whereof, I affix my signature.

ALBERT S. PLATER.